United States Patent
Iura

(10) Patent No.: US 9,764,465 B2
(45) Date of Patent: Sep. 19, 2017

(54) TRANSFER APPARATUS

(71) Applicant: DAIHEN Corporation, Osaka-shi, Osaka (JP)

(72) Inventor: Jun Iura, Osaka (JP)

(73) Assignee: DAIHEN Corporation, Osaka (JP)

( * ) Notice: Subject to any disclaimer, the term of this patent is extended or adjusted under 35 U.S.C. 154(b) by 74 days.

(21) Appl. No.: 14/308,224

(22) Filed: Jun. 18, 2014

(65) Prior Publication Data
US 2015/0000454 A1    Jan. 1, 2015

(30) Foreign Application Priority Data

Jun. 28, 2013  (JP) ................................. 2013-136399
Jun. 28, 2013  (JP) ................................. 2013-136400

(51) Int. Cl.
   B25J 9/10    (2006.01)
   B25J 9/00    (2006.01)

(52) U.S. Cl.
   CPC ............. B25J 9/107 (2013.01); B25J 9/0087 (2013.01); *Y10S 901/28* (2013.01); *Y10T 74/20329* (2015.01)

(58) Field of Classification Search
   CPC ................................ B25J 9/107; B25J 9/0087
   USPC ....................................................... 414/744.5
   See application file for complete search history.

(56) References Cited

U.S. PATENT DOCUMENTS

| 5,180,276 A | 1/1993 | Hendrickson |
| 6,132,165 A * | 10/2000 | Carducci ................. B25J 9/107 |
| | | 414/744.5 |
| 2007/0017560 A1* | 1/2007 | Kiyota ............. H01L 21/67742 |
| | | 134/137 |
| 2013/0202398 A1* | 8/2013 | Watanabe ................ B25J 9/107 |
| | | 414/744.6 |

FOREIGN PATENT DOCUMENTS

JP    7-504128    5/1995
WO    2006/137370 A1    12/2006

OTHER PUBLICATIONS

Office Action received in the corresponding Japanese Patent application, Feb. 28, 2017; 5 pages.

* cited by examiner

*Primary Examiner* — Gerald McClain
*Assistant Examiner* — Ronald Jarrett
(74) *Attorney, Agent, or Firm* — Hamre, Schumann, Mueller & Larson, P.C.

(57) ABSTRACT

A transfer apparatus includes a base, a first holder, a second holder offset from the first holder in a first direction, and a movement mechanism for moving the first holder and the second holder relative to the base in a plane parallel to the first direction. The movement mechanism includes a swing member, a first link arm and a second link arm. The swing member is pivotally supported on the base. The first link arm is pivotally connected to the first holder. The first link arm is also connected to the swing member for pivoting about a first intermediate axis extending in a second direction per- (Continued)

pendicular to the first direction. The second link arm is pivotally connected to the second holder. The second link arm is also connected to the swing member for pivoting about a second intermediate axis extending in the second direction. The first intermediate axis is offset from the second intermediate axis in the first direction.

10 Claims, 13 Drawing Sheets

TRANSFER APPARATUS

BACKGROUND OF THE INVENTION

1. Field of the Invention

The present invention relates to a transfer apparatus.

2. Description of the Related Art

Transfer apparatuses for transferring workpieces such as substrates are conventionally known (see e.g. JP-A 7-504128). FIG. 1 illustrates a conventional transfer apparatus. The illustrated transfer apparatus 900 is of the type called a "frog-leg" robot and has link arms 912-915, driving arms 917, 918, a base 919 and tables 925, 926.

The driving arms 917 and 918 are pivotally supported on the base 919. The base ends of the link arms 912 and 913 are pivotally connected to the respective driving arms 917 and 918. The front ends of the link arms 912 and 913 are connected to the table 925. Similarly, the base end of the link arm 914 and the base end of the link arm 915 are pivotally connected to the driving arm 917 and the driving arm 918, respectively. The front ends of the link arms 914 and 915 are connected to the table 926. Workpieces are transferred as placed on the tables 925, 926.

With the transfer apparatus 900 having such a structure, when the driving arms 917, 918 pivot relative to the base 919, the tables 925, 926 move forward or backward. FIG. 1 illustrates the apparatus 900 in its original posture. FIG. 2 illustrates the apparatus with the link arms 912 and 913 extended. The transfer apparatus 900 is configured to extend or retract the two pairs of link arms 912-915 with a small driving force, which is advantageous in terms of operation efficiency. For this purpose, the two pairs of link arms 912-915 are symmetrical with respect to a center line passing through the driving arms 917 and 918 in the original posture.

Generally, a transfer apparatus with a smaller rotation area is preferred. On the other hand, there is a demand for a transfer apparatus capable of transferring large workpieces. It may be considered necessary to increase the stroke of the extension/contraction movement of the tables 925, 926 to be able to transfer larger workpieces. The stroke of the extension/contraction movement of the table 925, 926 depends on the lengths of the link arms 912-915 and the lengths of the driving arms 917, 918. Thus, to increase the stroke of the extension/contraction movement, it may be considered necessary to increase the lengths of the arms 912-915 or the lengths of the driving arms 917, 918. However, when the lengths of the link arms 912-915 or the driving arms 917, 918 are increased, the rotation area of the transfer apparatus 900 inevitably increases.

SUMMARY OF THE INVENTION

The present invention has been conceived under the circumstances described above. It is therefore an object of the present invention to provide a transfer apparatus that is capable of transferring larger workpieces without increasing the rotation area.

According to a first aspect of the present invention, there is provided a transfer apparatus comprising a base, a first holder, a second holder offset from the first holder in a first direction and a movement mechanism for moving the first holder and the second holder relative to the base in a plane parallel to the first direction. The movement mechanism includes a swing arm, a first link arm and a second link arm. The movement mechanism includes a swing member, a first link arm and a second link arm. The swing member is pivotally supported on the base. The first link arm is pivotally connected to the first holder. The first link arm is also connected to the swing member for pivoting about a first intermediate axis extending in a second direction perpendicular to the first direction. The second link arm is pivotally connected to the second holder. The second link arm is also connected to the swing member for pivoting about a second intermediate axis extending in the second direction. The first intermediate axis is offset from the second intermediate axis in the first direction.

Preferably, the first link arm crosses the second link arm.

Preferably, the first link arm includes a bent portion projecting in the first direction.

Preferably, the second link arm includes a bent portion projecting in a third direction opposite from the first direction.

Preferably, the swing member is connected to the base for pivoting about a pivotal axis extending in the second direction.

In a first embodiment of the first aspect, the swing member comprises a swing arm, and both of the first link arm and the second link arm are pivotally connected to the swing arm. In this case, the swing arm crosses both of the first link arm and the second link arm.

In a second embodiment of the first aspect, the swing member comprises a swing arm assembly which includes a first swing arm having a first end pivotally connected to the base and a second end pivotally connected to the first link arm for pivoting about the first intermediate axis, a second swing arm having a first end pivotally connected to the base and a second end pivotally connected to the second link arm for pivoting about the second intermediate axis, and a connector pivotally connected to the first and second swing arms at the first and second intermediate axes, respectively.

In the second embodiment, the first swing arm is pivotally connected to the base for pivoting about a first pivotal axis. Similarly, the second swing arm is pivotally connected to the base for pivoting about a second pivotal axis. Tthe first pivotal axis is offset from the second pivotal axis in the first direction.

In the second embodiment, preferably, a distance between the first intermediate axis and the second intermediate axis is equal to a distance between the first pivotal axis and the second pivotal axis.

According to a second aspect of the present invention, there is provided a transfer apparatus comprising a base, a first holder, a second holder offset from the first holder in a first direction, and a movement mechanism for moving the first holder and the second holder relative to the base in a plane parallel to the first direction. The movement mechanism includes a pair of swing members, a pair of first link arms and a pair of second link arms. Each of the swing members is pivotally supported on the base. Each of the first link arms is pivotally connected to the first holder. Each of the first link arms is also connected to a respective one of the swing members for pivoting about a first intermediate axis extending in a second direction perpendicular to the first direction. Each of the second link arms is pivotally connected to the second holder. Each of the second link arms is also connected to a respective one of the swing members for pivoting about a second intermediate axis extending in the second direction. The first intermediate axis is offset from the second intermediate axis in the first direction.

Preferably, each of the first left link arms crosses a respective one of the second left link arms.

Preferably, the transfer apparatus may further comprise a drive unit disposed in the base for pivoting each of the swing members relative to the base.

Preferably, each of the first link arms includes a bent portion projecting in the first direction.

Preferably, each of the second link arms includes a bent portion projecting in a third direction opposite from the first direction.

In a first embodiment of the second aspect, each of the swing members comprises a swing arm, and each of the first link arms and each of the second link arms are pivotally connected to the swing arm. In this case, each of the swing arms crosses a respective one of the first link arms and a respective one of the second link arms.

In a second embodiment of the second aspect, each of the swing members comprises a swing arm assembly which includes a first swing arm having a first end pivotally connected to the base and a second end pivotally connected to a respective one of the first link arms for pivoting about the first intermediate axis, a second swing arm having a first end pivotally connected to the base and a second end pivotally connected to a respective one of the second link arms for pivoting about the second intermediate axis, and a connector pivotally connected to the first and second swing arms at the first and second intermediate axes, respectively.

In the second embodiment of the second aspect, preferably, the first swing arm is pivotally connected to the base for pivoting about a first pivotal axis. Similarly, the second swing arm is pivotally connected to the base for pivoting about a second pivotal axis. The first pivotal axis is offset from the second pivotal axis in the first direction.

In the second embodiment of the second aspect, preferably, a distance between the first intermediate axis and the second intermediate axis is equal to a distance between the first pivotal axis and the second pivotal axis.

Other features and advantages of the present invention will become clearer from the description given below with reference to the accompanying drawings.

DESCRIPTION OF THE PREFERRED EMBODIMENTS

Preferred embodiments of the present invention are described below with reference to the accompanying drawings.

First Embodiment

A first embodiment of the present invention is described below with reference to FIGS. 3-9.

Figure 3A:
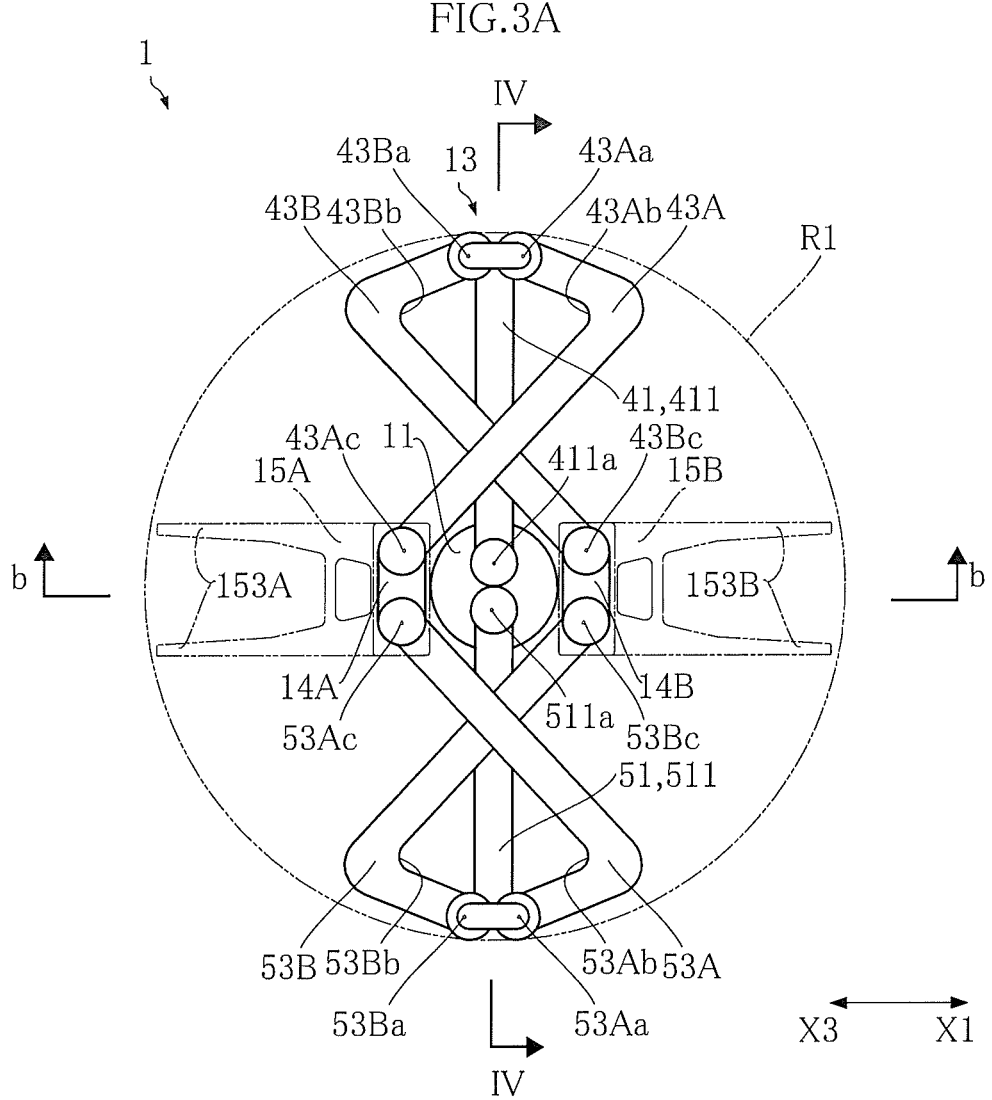
FIG. 3A is a plan view illustrating a transfer apparatus according to a first embodiment of the present invention.
Figure 3B:
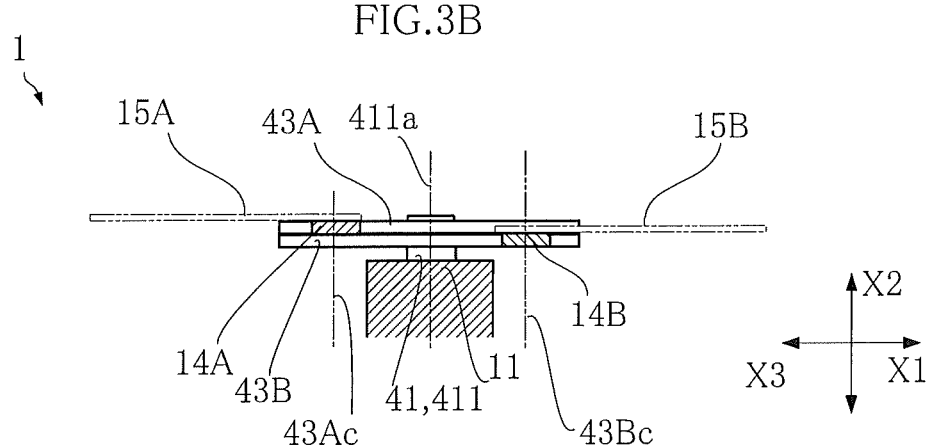
FIG. 3B is a sectional view taken along lines b-b in FIG. 3A.
Figure 4:
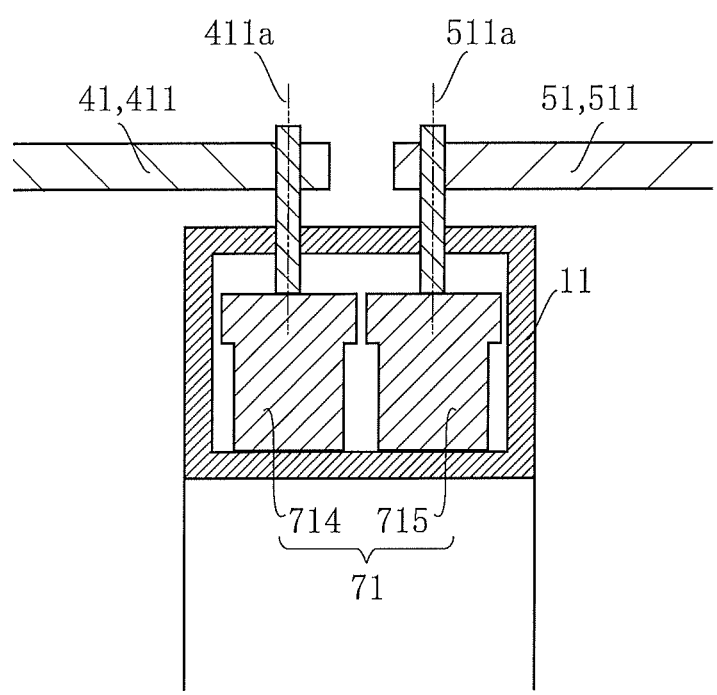
FIG. 4 is a schematic sectional view taken along lines IV-IV in FIG. 3.

FIG. 3A is a plan view illustrating a transfer apparatus according to a first embodiment of the present invention. FIG. 3B is a sectional view taken along lines b-b in FIG. 3A. FIG. 4 is a schematic partial sectional view taken along lines IV-IV in FIG. 3.

The transfer apparatus 1 illustrated in these figures is a transfer robot for transferring a workpiece 89 (see FIG. 5). The workpiece 89 may be a plate-like member such as a glass panel or substrate for a liquid crystal FPD. Though not illustrated, a workpiece storing mechanism (not shown) is arranged adjacent to the transfer apparatus 1: The workpiece receiving mechanism has a plurality of compartments each for storing a workpiece 89.

As illustrated in FIGS. 3A, 3B and 4, the transfer apparatus 1 includes a base 11, a movement mechanism 13, a first wrist 14A, a second wrist 14B, a first holder or hand 15A (indicated by chain lines in FIG. 3), a second holder or hand 15B (indicated by chain lines in FIG. 3) and a drive unit 71.

For instance, the base 11 includes a body and an upper mounting portion (details omitted). For instance, the body is in the form of a round column. The upper mounting portion is fixed to the upper end of the columnar body. The upper mounting portion is mounted to the bottom wall of a chamber in which the workpiece 89 is transferred from the workpiece storing mechanism to a processing unit. Thus, the base 11 is supported by the bottom wall of the chamber in a suspended state.

The movement mechanism 13 is a mechanism for moving the first wrist 14A and the second wrist 14B relative to the base 11. The details of the movement mechanism 13 will be described later.

The first wrist 14A and the second wrist 14B are moved by the movement mechanism 13 relative to the base 11 in a plane (horizontal plane in this embodiment) parallel to a first direction X1. As illustrated in FIG. 3, the second wrist 14B is offset from the first wrist 14A in the first direction X1. The first wrist 14A and the second wrist 14B make parallel translation while moving relative to the base 11.

The first holder 15A is fixedly attached to the first wrist 14A for integral movement. Thus, the first wrist 14A is regarded as part of the first holder 15A. The first holder 15A serves to hold a workpiece 89. The workpiece 89 is transferred to a desired position by the movement of the first holder 15A holding the workpiece 89. In this embodiment, the first holder 15A holds the workpiece 89 by supporting the workpiece 89 from below. However, the first holder 15A is not limited to this configuration. For instance, the first holder 15A may be configured to hold the workpiece 89 by sucking the upper surface of the workpiece 89.

In this embodiment, the first holder 15A has two first end effectors 153A. Each first end effector 153A is in the form of an elongated finger. The workpiece 89 is transferred as placed on the two first end effectors 153A.

The second holder 15B is fixedly attached to the second wrist 14B for integral movement. Thus, the second wrist 14B is regarded as part of the second holder 15B. The second holder 15B serves to hold a workpiece 89. The workpiece 89 is transferred to a desired position by the movement of the second holder 15B holding the workpiece 89. In this embodiment, the second holder 15B holds the workpiece 89 by supporting the workpiece 89 from below. However, the second holder 15B is not limited to this configuration. For instance, the second holder 15B may be configured to hold the workpiece 89 by sucking the upper surface of the workpiece 89.

In this embodiment, the second holder 15B has two second end effectors 153E. Each second end effector 153B is in the form of an elongated finger. The workpiece 89 is transferred as placed on the two second end effectors 153B.

The movement mechanism 13 is described next. In the following description, the terms "right" and "left" are used only to make distinction between two opposite sides of the transfer apparatus, so that whether the element referred to with a modifier "right" or "left" is actually located on the right side or left side is irrelevant.

As illustrated in FIGS. 3A and 3B, the movement mechanism 13 includes a right swing arm 41, a first right link arm 43A, a second right link arm 43B, a left swing arm 51, a first left link arm 53A and a second left link arm 53B.

The right swing arm 41 is supported on the base 11 for pivoting relative thereto. The right swing arm 41 is pivotable relative to the base 11 within a plane parallel to the first direction X1. In this embodiment, the right swing arm 41 is pivotable about a right pivotal axis 411a extending in a second direction X2 perpendicular to the first direction X1. In this embodiment, the right swing arm 41 is in the form of a straight bar 411 elongated in one direction.

To make the right swing arm 41 pivotable relative to the base 11, a non-illustrated shaft extending vertically upward is fitted in a hole formed at a base end of the right swing arm 41. Other pivotable parts described below are similarly made pivotable by fitting a shaft in a hole, and such explanation of the relationship of the shaft and the hole is omitted with respect to the other pivotable parts.

The first right link arm 43A is connected to the right swing arm 41 for pivoting relative thereto about a first right intermediate axis 43Aa extending in the second direction X2. Specifically, the right swing arm 41 has a free end pivotally connected to a base end of the first right link arm 43A. The first right link arm 43A has a free end connected to the first wrist 14A for pivoting relative thereto about a first right wrist axis 43Ac extending in the second direction X2. In plan view, the first right link arm 43A crosses the right swing arm 41.

The second right link arm 43B is connected to the right swing arm 41 for pivoting relative thereto about a second right intermediate axis 43Ba extending in the second direction X2. Specifically, the free end of the right swing arm 41 is pivotally connected to a base end of the second right link arm 43B. In plan view, the first right intermediate axis 43Aa is offset from the second right intermediate axis 43Ba in the first direction X1. The second right link arm 43B is connected to the second wrist 14B for pivoting relative thereto about a second right wrist axis 43Bc extending in the second direction X2. In plan view, the second right link arm 43B crosses the right swing arm 41 and the first right link arm 43A.

The first right link arm 43A is configured to avoid interference with the portion at which the right swing arm 41 and the second right link arm 43B are connected to each other. Specifically, in this embodiment, the first right link arm 43A is bent to have a bent portion 43Ab that points toward the first direction X1, as illustrated in FIG. 3A.

Similarly, the second right link arm 43B is configured to avoid interference with the portion at which the right swing arm 41 and the first right link arm 43A are connected to each other. Specifically, in this embodiment, the second right link arm 43B is bent to have a bent portion 43Bb that points toward a third direction X3 opposite to the first direction X1, as illustrated in FIG. 3A.

The left swing arm 51, the first left link arm 53A and the second left link arm 53B are symmetrical to the right swing arm 41, the first right link arm 43A and the second right link arm 43B, respectively, with respect to the base 11. Detailed description is given below.

The left swing arm 51 is supported on the base 11 for pivoting relative to the base 11. The left swing arm 51 is pivotable relative to the base 11 within a plane parallel to the first direction X1. In this embodiment, the left swing arm 51 is pivotable about a left pivotal axis 511a extending in the second direction X2 perpendicular to the first direction X1. In this embodiment, the left swing arm 51 is in the form of a straight bar 511 elongated in one direction.

In this embodiment, the left pivotal axis 511a is provided at a different position from the right pivotal axis 411a. Specifically, the left pivotal axis 511a and the right pivotal axis 411a are spaced apart from each other in a direction that is perpendicular to the first and second directions X1, X2 in FIGS. 3A and 3B. Unlike this embodiment, the left pivotal axis 511a and the right pivotal axis 411a may be spaced apart from each other in the first or third direction X1, X3 in FIG. 3A. Alternatively, the left pivotal axis 511a and the right pivotal axis 411a may be provided at the same position. That is, the right swing arm 41 and the left swing arm 51 may share a common shaft.

The first left link arm 53A is connected to the left swing arm 51 for pivoting relative to thereto about a second right intermediate axis 53Aa extending in the second direction X2. Specifically, the left swing arm 51 has a free end pivotally connected to abase end of the first left link arm 53A. The first left link arm 53A has a free end connected to the first wrist 14A for pivoting relative to the first wrist 14A about a first left wrist axis 53Ac extending in the second direction X2. In plan view, the first left link arm 53A crosses the left swing arm 51.

The second left link arm 53B is connected to the left swing arm 51 for pivoting relative thereto about a second left intermediate axis 53Ba extending in the second direction X2. Specifically, the free end of the left swing arm 51 is pivotally connected to a base end of the second left link arm 53B. In plan view, the first left intermediate axis 53Aa is offset from the second left intermediate axis 53Ba in the first direction X1. The second left link arm 53B is connected to the second wrist 14B for pivoting relative thereto about a second left wrist axis 53Bc extending in the second direction X2. In plan view, the second left link arm 53B crosses the left swing arm 51 and the first left link arm 53A.

The first left link arm 43A is configured to avoid interference with the portion at which the right swing arm 41 and the second right link arm 43B are connected to each other. Specifically, in this embodiment, the first left link arm 53A is bent to have a bent portion 53Ab that points toward the first direction X1, as illustrated in FIG. 3A.

Similarly, the second left link arm 53B is configured to avoid interference with the portion at which the left swing arm 51 and the first left link arm 53A are connected to each other. Specifically, in this embodiment, the second left link arm 53B is bent to have a bent portion 53Bb that points toward the third direction X3 opposite to the first direction X1, as illustrated in FIG. 3A.

The drive unit 71 illustrated in FIG. 4 is a driving source for pivoting the right swing arm 41 and the left swing arm 51. For instance, the drive unit 71 is arranged in the base 11 (specifically, in the body). In this embodiment, the drive unit 71 includes two motors 714 and 715. Rotation of the motor 714 is transmitted to the right swing arm 41 via a reduction gear mechanism (not shown). Thus, the right swing arm 41 pivots relative to the base 11. Similarly, rotation of the motor 715 is transferred to the left swing arm 51 via a reduction gear mechanism (not shown). Thus, the left swing arm 51 pivots relative to the base 11.

Although the drive unit 71 includes two motors in the illustrated example, the drive unit 71 may include a single motor 1. In this case, the single motor and a plurality of gears are used to pivot the right swing arm 41 and the left swing arm 51.

Operation of the transfer apparatus 1 is described below.

[Original Posture]

The posture of the transfer apparatus 1 illustrated in FIG. 3A is referred to as "original posture". In the transfer apparatus 1 having the original posture, the first holder 15A and the first wrist 14A are offset in the first direction X1 relative to their positions in the first extension posture described later. Also, the second holder 15B and the second wrist 14B are offset in the third direction X3 relative to their positions in the second extension posture described later.

[From Original Posture to First Extension Posture]

Figure 5A:
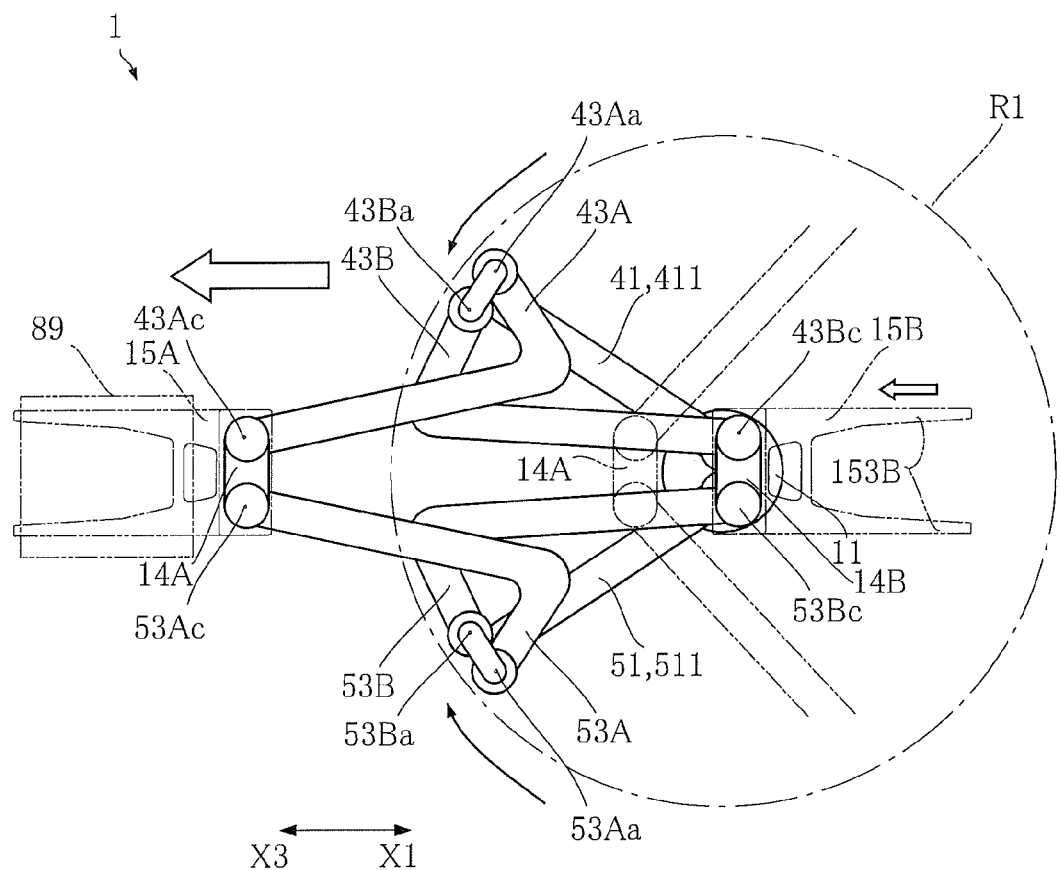
FIG. 5A is a plan view illustrating a first extension posture of the transfer apparatus illustrated in FIGS. 3A and 3B.

Then, by actuating the drive unit 71, the right swing arm 41 is pivoted counterclockwise relative to the base 11, whereas left swing arm 51 is pivoted clockwise relative to the base 11, as illustrated in FIG. 5A. This pivoting causes the first right link arm 43A to pivot relative to the right swing arm 41 while causing the first left link arm 53A to pivot relative to the left swing arm 51. As a result, the first holder 15A and the first wrist 14A advance in the third direction X3.

Such pivoting of the right swing arm 41 and the left swing arm 51 also causes the second right link arm 43B to pivot relative to the right swing arm 41 while causing the second left link arm 53B to pivot relative to the left swing arm 51. As a result, the second holder 15B and the second wrist 14B also move in the third direction X3. The movement speed (retreating speed) of the second holder 15B and the second wrist 14B is lower than the advancing speed of the first holder 15A and the first wrist 14A.

Figure 5B:
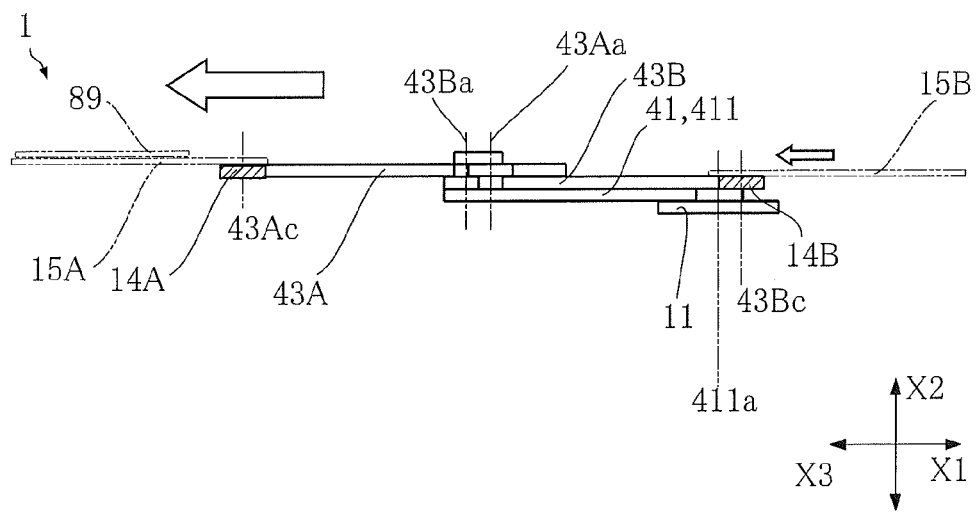
FIG. 5B is a sectional view of the transfer apparatus illustrated in FIG. 5A.

In this way, as illustrated in FIGS. 5A and 5B, the transfer apparatus 1 shifts to the posture in which the arms of the movement mechanism 13 (right swing arm 41, left swing arm 51, first right link arm 43A and first left link arm 53A) are extended. The posture of the transfer apparatus 1 illustrated in FIG. 5 is referred to as "first extension posture". With the transfer apparatus 1 assuming the first extension posture, a workpiece 89 is supported (placed) on the first holder 15A due to e.g. upward movement of the movement mechanism 13 together with the first holder 15A.

[From First Extension Posture to Original Posture]

Figure 6:
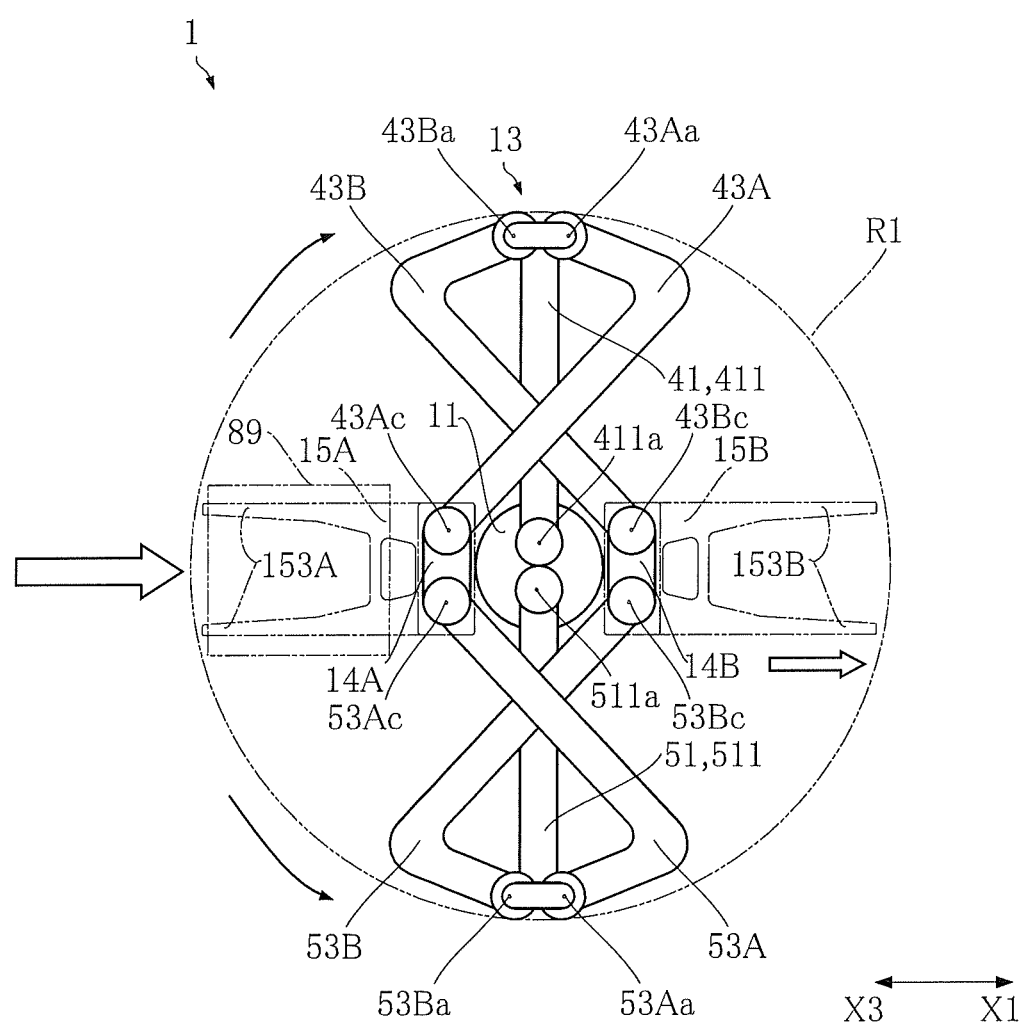
FIG. 6 is a plan view illustrating an original posture of the transfer apparatus subsequent to FIG. 5.

Then, the right swing arm 41 and the left swing arm 51 are pivoted in the directions opposite to the previous pivotal directions shown in FIG. 5A. Specifically, the right swing arm 41 is pivoted clockwise relative to the base 11, whereas the left swing arm 51 is pivoted counterclockwise relative to the base 11. In this way, as illustrated in FIG. 6 (FIG. 3A as well), the transfer apparatus 1 returns to the original posture with the workpiece 89 held on the first holder 15A.

[From Original Posture to Second Extension Posture]

Figure 7:
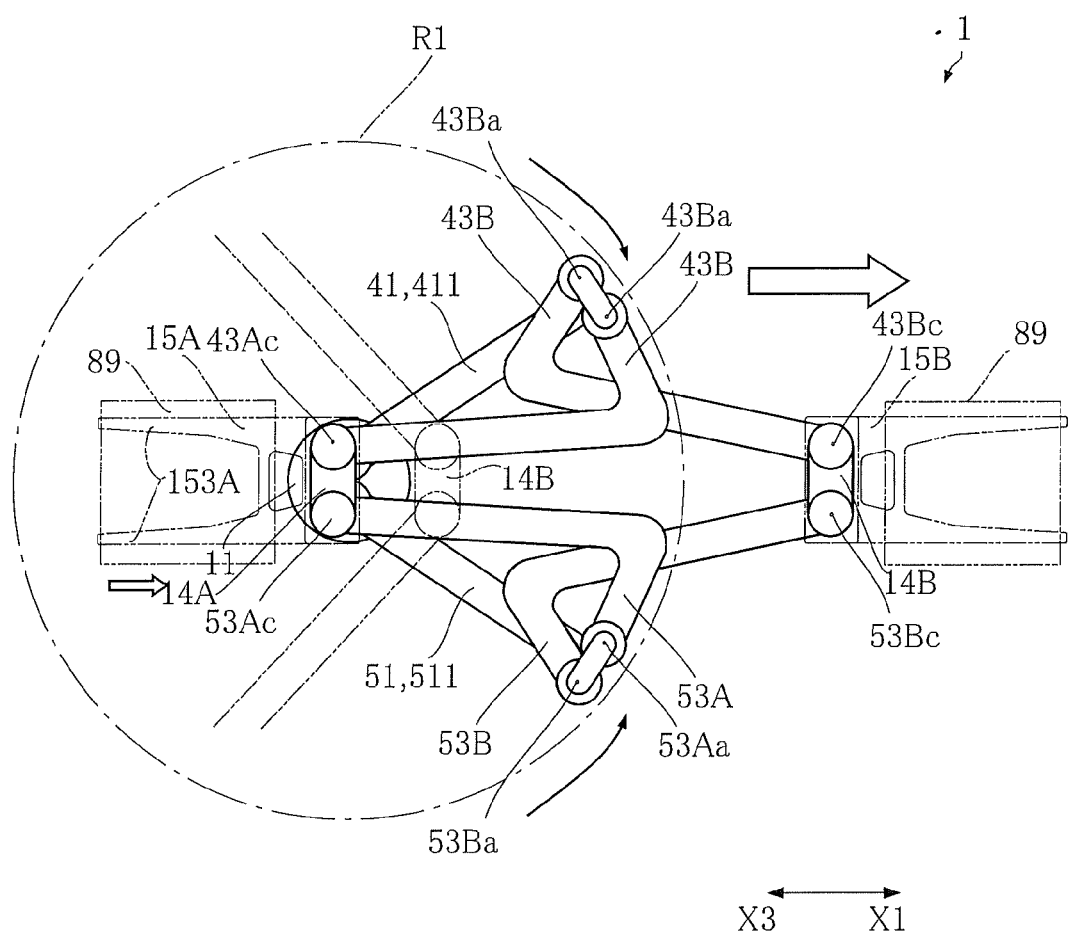
FIG. 7 is a plan view illustrating a second extension posture of the transfer apparatus shifted from the original posture of FIG. 6.

As illustrated in FIG. 7, the right swing arm 41 is further pivoted clockwise relative to the base 11, while the left swing arm 51 is further pivoted counterclockwise relative to the base 11. As a result, the second right link arm 43B pivots relative to the right swing arm 41, whereas the second left link arm 53B pivots relative to the left swing arm 51. As a result, the second holder 15B and the second wrist 14B advances in the first direction X1.

Such pivoting of the right swing arm 41 and the left swing arm 51 also causes the first right link arm 43A to pivot relative to the right swing arm 41 while causing the first left link arm 53A to pivot relative to the left swing arm 51. As a result, the first holder 15A and the first wrist 14A also move in the first direction X1. The movement speed (retreating speed) of the first holder 15A and the first wrist 14A is lower than the advancing speed of the second holder 15B and the second wrist 14B.

In this way, as illustrated in FIG. 7, the transfer apparatus 1 shifts to the posture in which the arms (right swing arm 41, left swing arm 51, second right link arm 43B and second left link arm 53B) are extended. The posture of the transfer apparatus 1 illustrated in FIG. 7 is referred to as "second extension posture". With the transfer apparatus 1 assuming the second extension posture, a workpiece 89 is supported (placed) on the second holder 15B due to e.g. upward movement of the movement mechanism 13 along with the second holder 15B.

[From Second Extension Posture to Original Posture]

Figure 8:
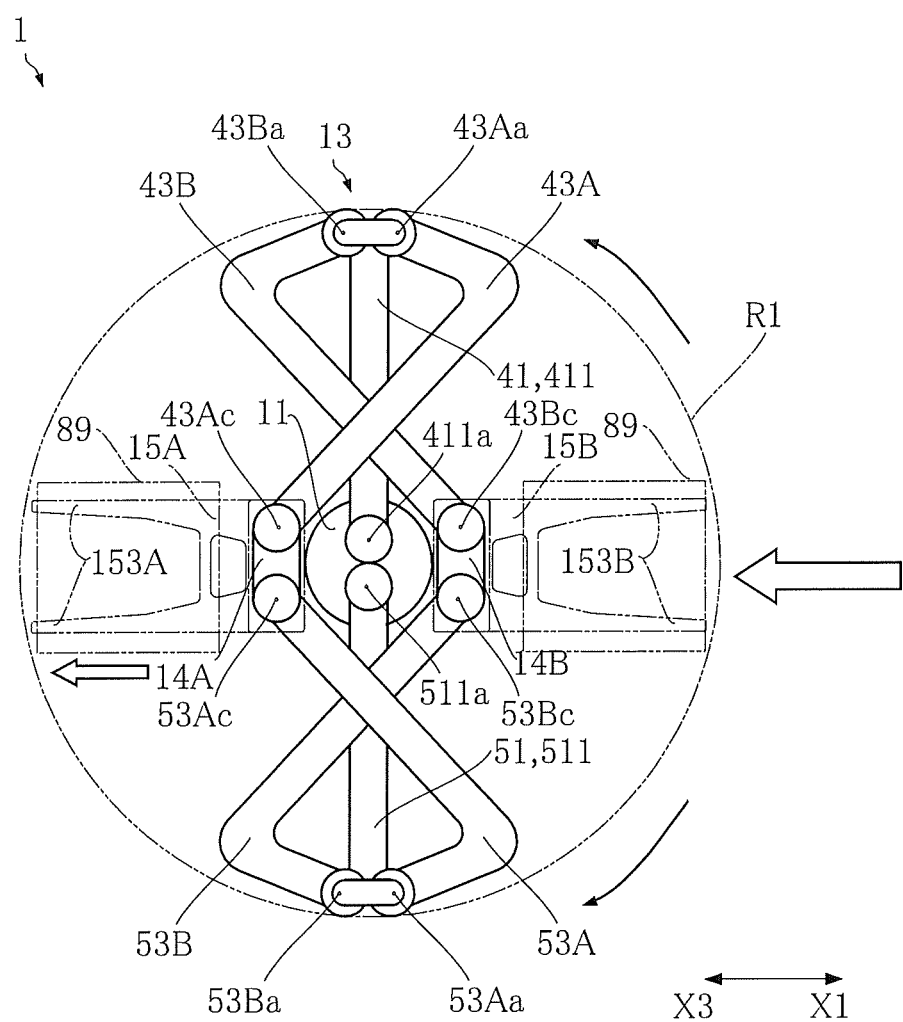
FIG. 8 is a plan view illustrating the original posture of the transfer apparatus shifted from the second extension posture of FIG. 7.

Then, the right swing arm 41 and the left swing arm 51 are pivoted in the directions opposite to the previous pivotal directions of FIG. 7. Specifically, the right swing arm 41 is pivoted counterclockwise relative to the base 11, whereas the left swing arm 51 is pivoted clockwise relative to the base 11. In this way, as illustrated in FIG. 8 (FIGS. 3 and 6 as well), the transfer apparatus 1 returns to the original posture with the workpiece 89 held on the first holder 15A and the second holder 15B.

[Rotation of Transfer Apparatus]

Figure 9:
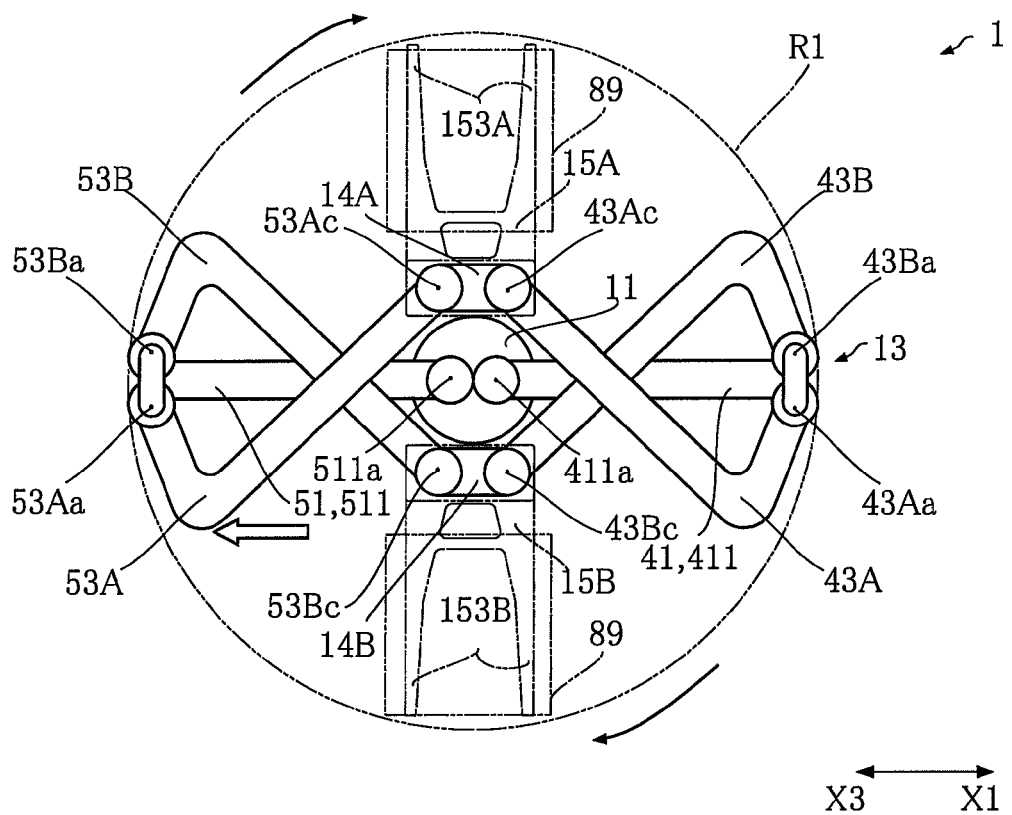
FIG. 9 is a plan view illustrating the transfer apparatus that has been turned after assuming the original posture of FIG. 8.

Then, as illustrated in FIG. 9, the base 11 is rotated clockwise through 90 degrees, for example. In FIG. 9, the rotation area in which the transfer apparatus 1 can rotate while assuming the original posture is indicated as rotation range R1. Thereafter, though not illustrated, the transfer apparatus 1 is shifted to the above-described first extension posture and the workpiece 89 on first holder 15A is placed at a desired position outside the transfer apparatus 1. Similarly, the transfer apparatus 1 is shifted to the above-described second extension posture and the workpiece 89 on the second holder 15B is placed at a desired position outside the transfer apparatus 1. In this way, the transfer apparatus 1 performs transfer of workpieces 89.

[Advantages]

Figure 1:
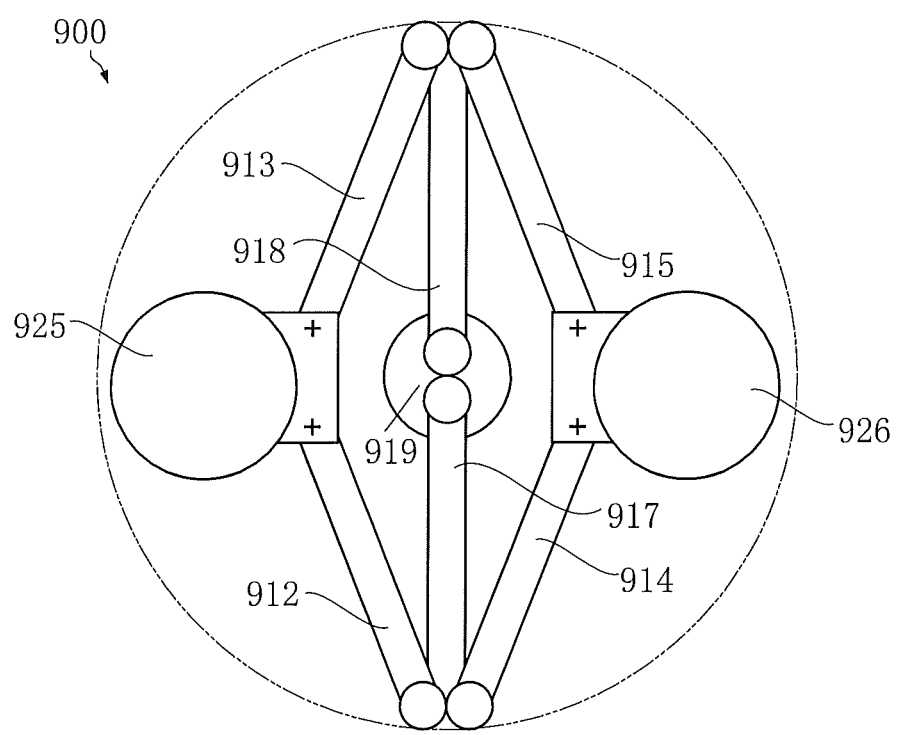
FIG. 1 is a plan view illustrating a conventional transfer apparatus.
Figure 2:
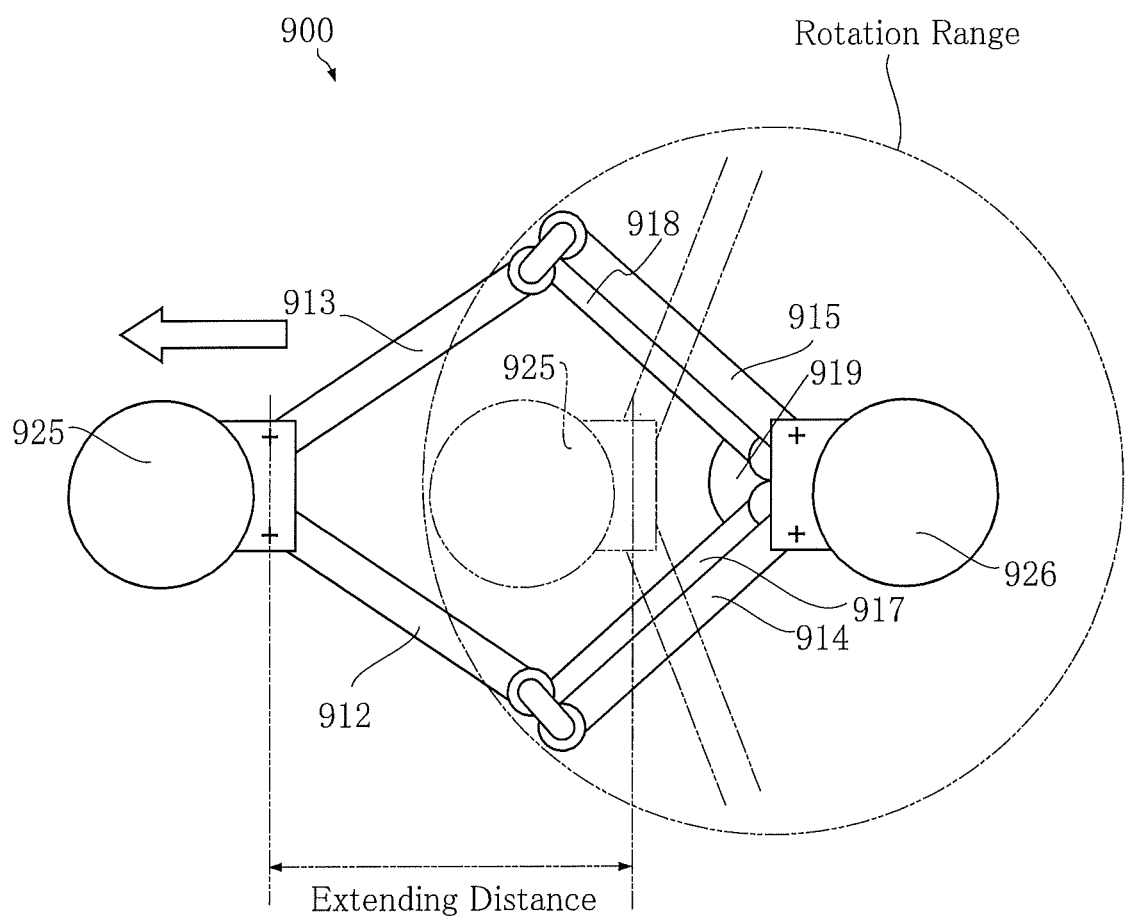
FIG. 2 is a plan view illustrating the conventional transfer apparatus in a different posture.

Advantages of the embodiment are described below. According to the first embodiment, as illustrated in FIG. 3A, the first right link arm 43A is connected to the right swing arm 41 for pivoting about the first right intermediate axis 43Aa extending in the second direction X2. Similarly, the second right link arm 43B is connected to the right swing arm 41 for pivoting about the second right intermediate axis 43Ba extending in the second direction X2. In plan view, the first right intermediate axis 43Aa is offset from the second right intermediate axis 43Ba in the first direction X1 in spite of the fact that the first wrist 14A associated with the first right intermediate axis 43Aa is offset from the right pivotal axis 411a of the right swing arm 41 in the third direction X3. Conversely, the second right intermediate axis 43Ba is offset from the first right intermediate axis 43Aa in the third direction X3 in spite of the fact that the second wrist 14B associated with the second right intermediate axis 43Ba is offset from the right pivotal axis 411a of the right swing arm 41 in the first direction X1. On the third direction X3 side of the transfer apparatus, therefore, the position of the first wrist 14A in the original posture of the transfer apparatus 1 can be brought closer to the right pivotal axis 411a of the right swing arm 41 by as much as the first right intermediate axis 43Aa is offset from the second right intermediate axis 43Ba in the first direction X1, in comparison with the prior art structure shown in FIGS. 1 and 2. On the first direction X1 side of the transfer apparatus, similarly, the position of the second wrist 14B in the original posture of the transfer apparatus 1 can be brought closer to the right pivotal axis 411a of the right swing arm 41 by as much as the first right intermediate axis 43Aa is offset from the second right intermediate axis 43Ba in the first direction X1, in comparison with the prior art structure shown in FIGS. 1 and 2. Such an arrangement is suitable for transferring larger workpieces 89 without enlarging the rotation range R1 of the transfer apparatus 1.

The above-described advantage is explained in more detail. The first holder 15A and the second holder 15B are designed so as to be contained in the rotation range R1 when the transfer apparatus 1 assumes the original posture. This is for the purpose of preventing the first holder 15A or the second holder 15B from coming into contact with the elements (e.g. workpiece storing mechanism, not shown) arranged outside the rotation range R1 when the transfer apparatus 1 in the original posture rotates. In the first embodiment, as noted above, when the transfer apparatus 1 assumes the original posture, the first wrist 14A and the second wrist 14B are properly positioned close to the pivotal axis 411a of the right swing arm 41 (and the pivotal axis 511a of the left swing arm 51). Thus, the first holder 15A and the second holder 15B can be made to have a relatively large dimension in the first direction X1 and in the third direction X3, respectively, without enlarging the rotation range R1. Such a holder is capable of holding (supporting) a larger workpiece 89. Thus, according to this embodiment, larger workpieces 89 can be transferred without enlarging the rotation range R1.

Since the transfer apparatus 1 is capable of transferring relatively large workpieces 89 without enlarging the rotation range R1, the transfer apparatus 1 can replace an existing transfer apparatus having the same rotation range R1, without the need for changing the other units in the system that includes the transfer apparatus.

In the first embodiment, the first left link arm 53A is connected to the left swing arm 51 for pivoting about the first left intermediate axis 53Aa extending in the second direction X2. Similarly, the second left link arm 53B is connected to the left swing arm 51 for pivoting about the second left intermediate axis 53Ba extending in the second direction X2. In plan view, the first left intermediate axis 53Aa is offset from the second left intermediate axis 53Ba in the first direction X1 in spite of the fact that the first wrist 14A associated with the first left intermediate axis 53Aa is offset from the right pivotal axis 511a of the left swing arm 51 in the third direction X3. Conversely, the second left intermediate axis 53Ba is offset from the first left intermediate axis 53Aa in the third direction X3 in spite of the fact that the second wrist 14B associated with the second left intermediate axis 53Ba is offset from the left pivotal axis 511a of the left swing arm 51 in the first direction X1. On the third direction X3 side of the transfer apparatus, therefore, the position of the first wrist 14A in the original posture of the transfer apparatus 1 can be brought closer to the left pivotal axis 511a of the left swing arm 51 by as much as the first left intermediate axis 53Aa is offset from the second left intermediate axis 53Ba in the first direction X1, in comparison with the prior art structure shown in FIGS. 1 and 2. On the first direction X1 side of the transfer apparatus, similarly, the position of the second wrist 14B in the original posture of the transfer apparatus 1 can be brought closer to the left pivotal axis 511a of the left swing arm 51 by as much as the first left intermediate axis 53Aa is offset from the second left intermediate axis 53Ba in the first direction X1, in comparison with the prior art structure shown in FIGS. 1 and 2. Such an arrangement is suitable for transferring larger workpieces 89 without enlarging the rotation range R1 of the transfer apparatus 1, as previously described with respect to the right swing arm 41, the first right link arm 43A and the second right link arm 43B.

In the first embodiment, the first right link arm 43A has a bent portion 43Ab pointing in the first direction X1. According to this structure, the first right link arm 43A is prevented from interfering with the shaft portion (or its bearing) extending along the second right intermediate axis 43Ba. This allows the first right link arm 43A to be extended sufficiently. Thus, the transfer apparatus 1 is capable of having the first extension posture that is sufficiently extended. The same advantage is equally applicable to the second right link arm 43B, the first left link arm 53A and the second left link arm 53B, each of which is sufficiently elongated by the provision of the bent portion 43Bb, 53Aa, 53Bb, respectively.

Figure 10:
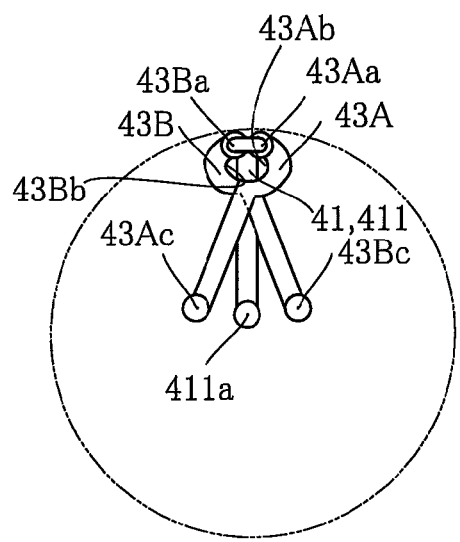
FIG. 10 is a plan view illustrating a variation of the first embodiment of the present invention.

The shape of the bent portion of each link arm is not limited to that illustrated in FIG. 3A. For instance, the bent portion 43Ab, 43Bb may have the shape illustrated in FIG. 10.

Second Embodiment

A second embodiment of the present invention is described below with reference to FIGS. 11-15.

Figure 11:
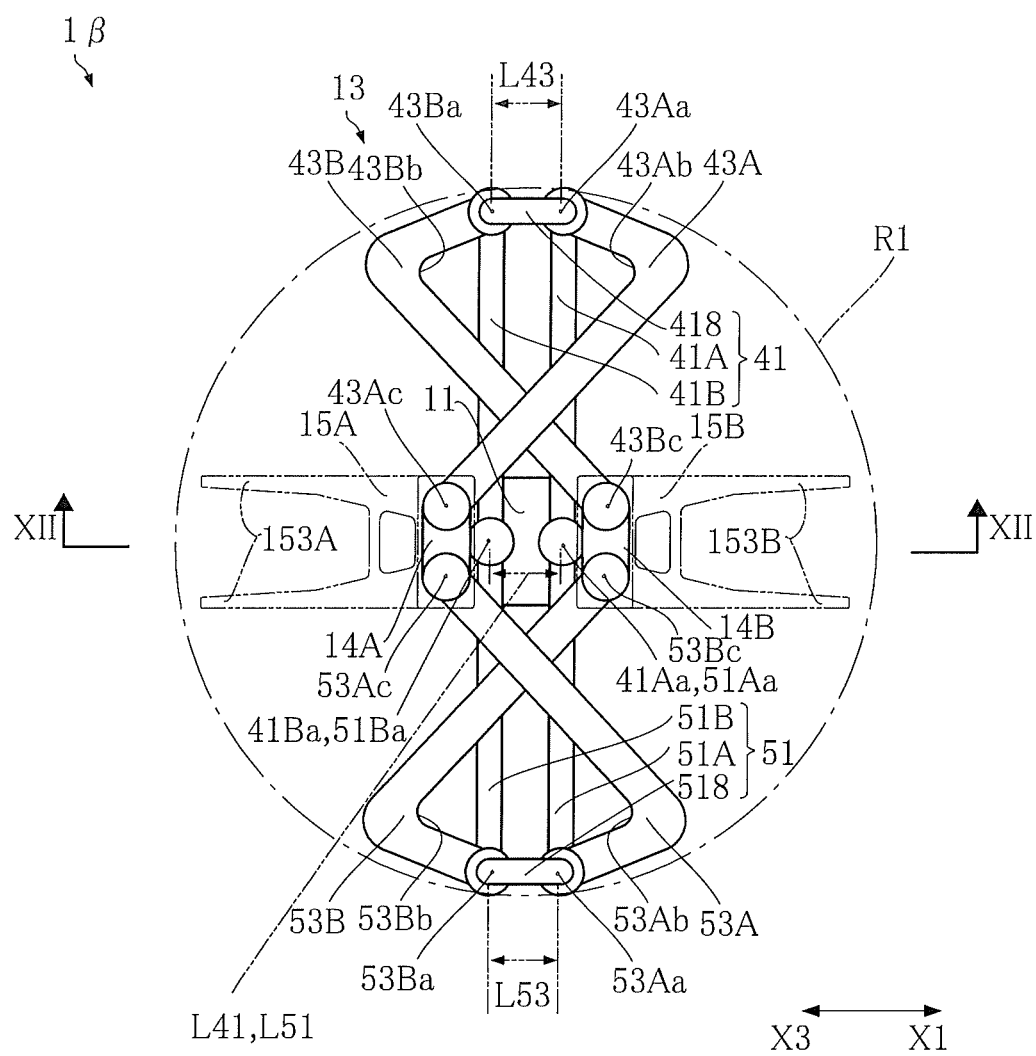
FIG. 11 is a plan view illustrating a transfer apparatus according to a second embodiment of the present invention.
Figure 12:
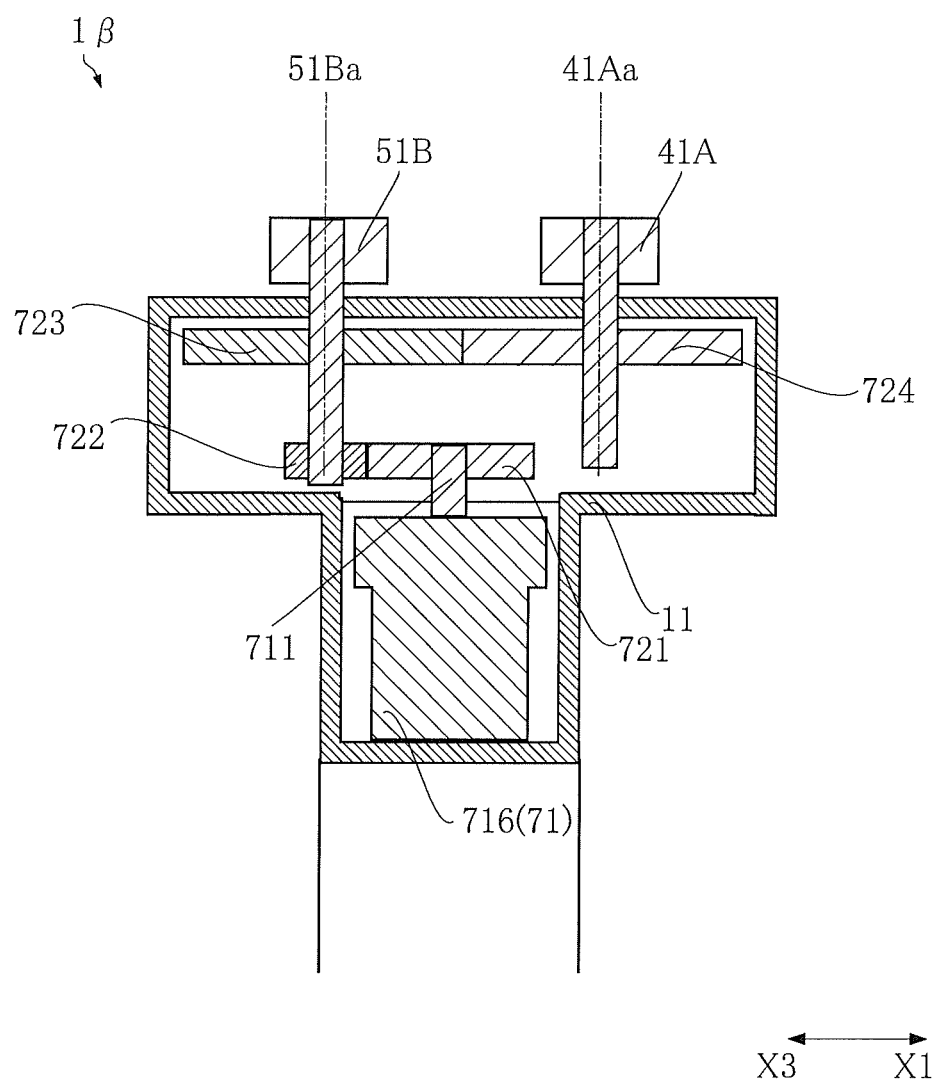
FIG. 12 is a schematic partial sectional view taken along lines XII-XII in FIG. 11.

FIG. 11 is a plan view illustrating a transfer apparatus according to a second embodiment of the present invention. FIG. 12 is a schematic partial sectional view taken along lines XII-XII in FIG. 11.

In the description given below, the elements that are identical or similar to those of the first embodiment are designated by the same reference signs as those used for the first embodiment, and explanation of these elements may be omitted where such omission is appropriate.

The transfer apparatus 1β illustrated in FIGS. 11 and 12 includes a base 11, a movement mechanism 13, a first wrist 14A, a second wrist 14B, a first holder 15A and a second holder 15B, a drive unit 71 (see FIG. 12) and gears 721-724. The structures of the elements other than the movement mechanism 13, the drive unit 71 and the gears 721-724 of the second embodiment are substantially the same as those of the transfer apparatus 1, so that explanation of these elements are omitted.

The movement mechanism 13 of the transfer apparatus 1β differs from that of the transfer apparatus 1 with respect to the structure of a right swing arm assembly 41 and a left swing arm assembly 51.

In the second embodiment again, the right swing arm assembly 41 is supported on the base 11 for pivoting relative thereto. The right swing arm assembly 41 is pivotable relative to the base 11 within a plane parallel to the first direction X1.

The right swing arm assembly 41 includes a first right swing arm 41A, a second right swing arm 41B and a right connector 418.

Each of the first right swing arm 41A and the second right swing arm 41B is in the form of an elongated bar. The pivotal axis of the first right swing arm 41A and the pivotal axis of the second right swing arm 41B are provided at different positions. Specifically, the first right swing arm 41A is connected to the base 11 for pivoting relative to the base 11 about the first right pivotal axis 41Aa extending in the second direction X2. The second right swing arm 41B is connected to the base 11 for pivoting relative to the base 11 about the second right pivotal axis 41Ba extending in the second direction X2. The first right pivotal axis 41Aa is offset from the second right pivotal axis 41Ba in the first direction X1. The second right pivotal axis 41Ba and the first right pivotal axis 41Aa are aligned in the first and third directions X1, X3 in FIG. 11.

The right connector 418 is pivotally connected to the first right swing arm 41A and the second right swing arm 41B. Specifically, the right connector 418 is pivotally connected to the first right swing arm 41A at the first right intermediate axis 43Aa. Similarly, the right connector 418 is pivotally connected to the second right swing arm 41B at the second right intermediate axis 43Ba.

The first right link arm 43A is pivotally connected to the first right swing arm 41A at the first right intermediate axis 43Aa. The second right link arm 43B is pivotally connected to the second right swing arm 41B at the second right intermediate axis 43Ba.

In the second embodiment, the distance L41 between the first right pivotal axis 41Aa and the second right pivotal axis 41Ba is equal to the distance L43 between the first right intermediate axis 43Aa and the second right intermediate axis 43Ba. Unlike this embodiment, the distance L41 may be smaller or larger than the distance L43.

In the second embodiment again, the left swing arm assembly 51 is supported on the base 11 for pivoting relative thereto. The left swing arm assembly 51 is pivotable relative to the base 11 within a plane parallel to the first direction X1.

The left swing arm assembly 51 includes a first left swing arm 51A, a second left swing arm 51B and a left connector 518.

Each of the first left swing arm 51A and the second left swing arm 51B is in the form of an elongated bar. The pivotal axis of the first left swing arm 51A and the pivotal axis of the second left swing arm 51B are provided at different positions. Specifically, the first left swing arm 51A is pivotally connected to the base 11 at the first left pivotal axis 51Aa extending in the second direction X2. The second left swing arm 51B is pivotally connected to the base 11 at the second left pivotal axis 51Ba extending in the second direction X2. The first left pivotal axis 51Aa is offset from the second left pivotal axis 51Ba in the first direction X1. The second left pivotal axis 51Ba and the first left pivotal axis 51Aa are aligned in the first and third directions X1, X3 in FIG. 11.

In the second embodiment, the first left pivotal axis 51Aa and the first right pivotal axis 41Aa are provided at the same position. Similarly, the second left pivotal axis 51Ba and the second right pivotal axis 41Ba are provided at the same position. Alternatively, the first left pivotal axis 51Aa and the first right pivotal axis 41Aa may be provided at different positions, and the second left pivotal axis 51Ba and the second right pivotal axis 41Ba may be provided at different positions.

The left connector 518 is pivotally connected to the first left swing arm 51A and the second left swing arm 51B for pivotal movement relative thereto. Specifically, the left connector 518 is pivotally connected to the first left swing arm 51A at the first left intermediate axis 53Aa. Similarly, the left connector 518 is pivotally connected to the second left swing arm 51B at the second left intermediate axis 53Ba.

The first left link arm 53A is connected to the first left swing arm 51A for pivoting relative thereto about the first left intermediate axis 53Aa. The second left link arm 53B is connected to the second left swing arm 51B for pivoting relative thereto about the second left intermediate axis 53Ba.

In the second embodiment, the distance L51 between the first left pivotal axis 51Aa and the second left pivotal axis 51Ba is equal to the distance L53 between the first left intermediate axis 53Aa and the second left intermediate axis 53Ba. Alternatively, the distance L51 may be smaller or larger than the distance L53.

In the second embodiment, one of the first right swing arm 41A and the second right swing arm 41B is a driving arm pivoted by the drive unit 71 illustrated in FIG. 12, whereas the other of the first right swing arm 41A and the second right swing arm 41B is a follower arm that pivots following the rotation of the driving arm. One of the first left swing arm 51A and the second left swing arm 51B is a driving arm pivoted by the drive unit 71, whereas the other of the first left swing arm 51A and the second left swing arm 51B is a follower arm that pivots following the rotation of the driving arm.

In the second embodiment, the first right swing arm 41A and the second left swing arm 51B are driving arms, whereas the second right swing arm 41B and the first left swing arm 51A are follower arms. Thus, the first right swing arm 41A and the second left swing arm 51B are pivoted by the drive unit 71. The diving force of the drive unit 71 is not directly transmitted to the second right swing arm 41B and the first left swing arm 51A. Pivoting of the first right swing arm 41A is transmitted to the second right swing arm 41B via the right connector 418. As a result, the second right swing arm 41B pivots following the pivoting of the first right swing arm 41A. Similarly, pivoting of the second left swing arm 51B is transmitted to the first left swing arm 51A via the left connector 518. Thus, the first left swing arm 51A pivots following the pivoting of the second left swing arm 51B.

In the second embodiment, the first right swing arm 41A and the second left swing arm 51B are driving arms, whereas the second right swing arm 41B and the first left swing arm 51A are follower arms. However, the first right swing arm 41A and the second left swing arm 51B may be follower arms, whereas the second right swing arm 41B and the first left swing arm 51A may be driving arms. As another alternative, the first right swing arm 41A and the first left swing arm 51A may be driving arms, whereas the second right swing arm 41B and the second left swing arm 51B may be follower arms. As a further alternative, the first right swing arm 41A and the first left swing arm 51A may be follower arms, whereas the second right swing arm 41B and the second left swing arm 51B may be driving arms.

The drive unit 71 illustrated in FIG. 12 is a driving source for pivoting the right swing arm assembly 41 and the left swing arm assembly 51. For instance, the drive unit 71 is arranged in the base 11 (specifically, in the body).

As illustrated in FIG. 12, the drive unit 71 comprises a single motor 716. A gear 721 is fixed to the drive shaft 711 of the motor 716. The gear 721 meshes with a gear 722 which is fixed to the pivotal shaft of the second left swing arm 51B. A gear 723 is also fixed to the pivotal shaft of the second left swing arm 51B. The gear 723 meshes with a gear 724 which is fixed to the pivotal shaft of the first right swing arm 41A.

When the drive shaft 711 of the motor 716 rotates, the gear 721 also rotates with the drive shaft 711. The rotation of the gear 721 is transmitted to the pivotal shaft of the second left swing arm 51B via the gear 722. As a result, the second left swing arm 51B pivots. On the other hand, when the pivotal shaft of the second left swing arm 51B rotates, the gear 723 also rotates. This rotation of the gear 723 is transmitted to the pivotal shaft of the first right swing arm 41A via the gear 724. As a result, the first right swing arm 41A pivots.

The pivotal shaft of the first right swing arm 41A and the pivotal shaft of the second left swing arm 51B rotates in opposite directions. Thus, the first right swing arm 41A and the second left swing arm 51B pivot in opposite directions. For instance, when the first right swing arm 41A pivots clockwise, the second left swing arm 51B pivots counterclockwise. When the first right swing arm 41A pivots counterclockwise, the second left swing arm 51B pivots clockwise.

Operation of the transfer apparatus 1β is described below.
[Original Posture]

Similarly to the first embodiment, the posture of the transfer apparatus 1β illustrated in FIG. 11 is referred to as "original posture".
[From Original Posture to First Extension Posture]

Figure 13:
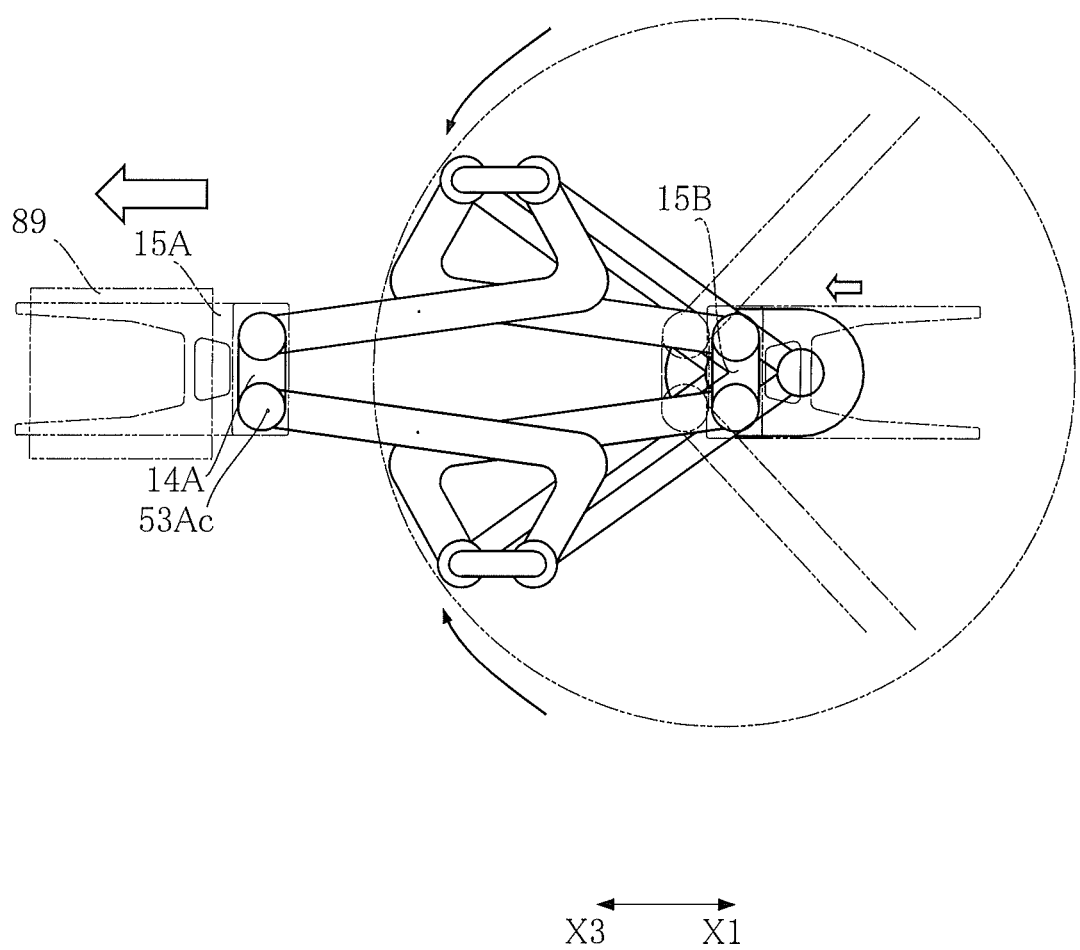
FIG. 13 is a plan view illustrating a first extension posture of the transfer apparatus of FIG. 11.
Figure 14:
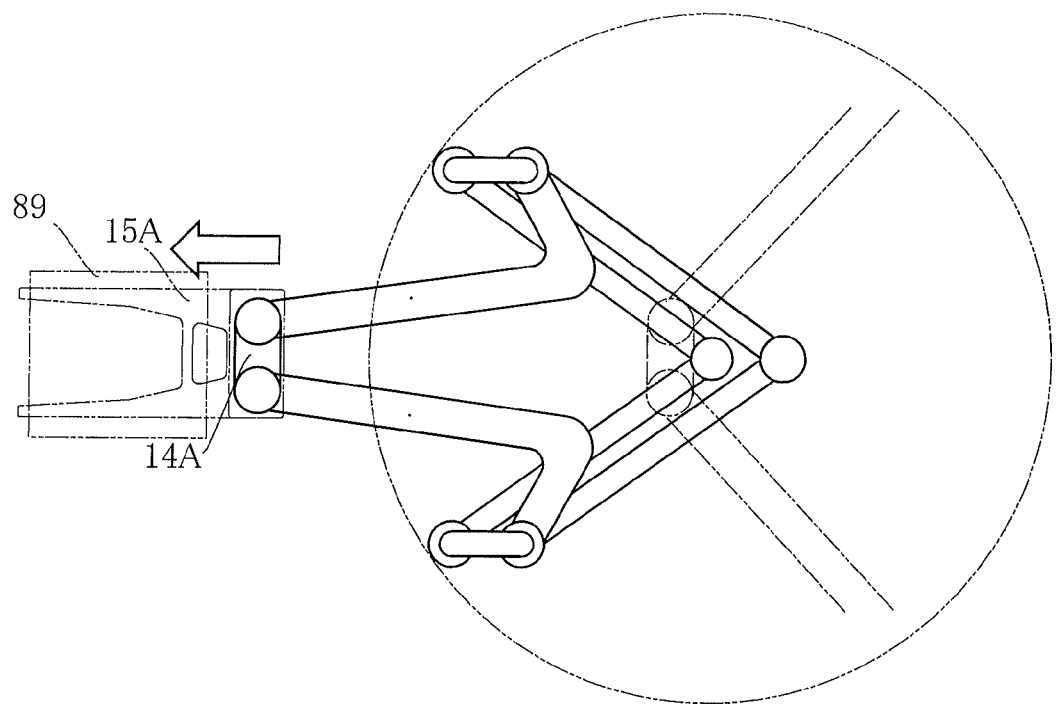
FIG. 14 is a planview similar to FIG. 13 wherein some components are omitted for convenience of illustration.
Figure 15:
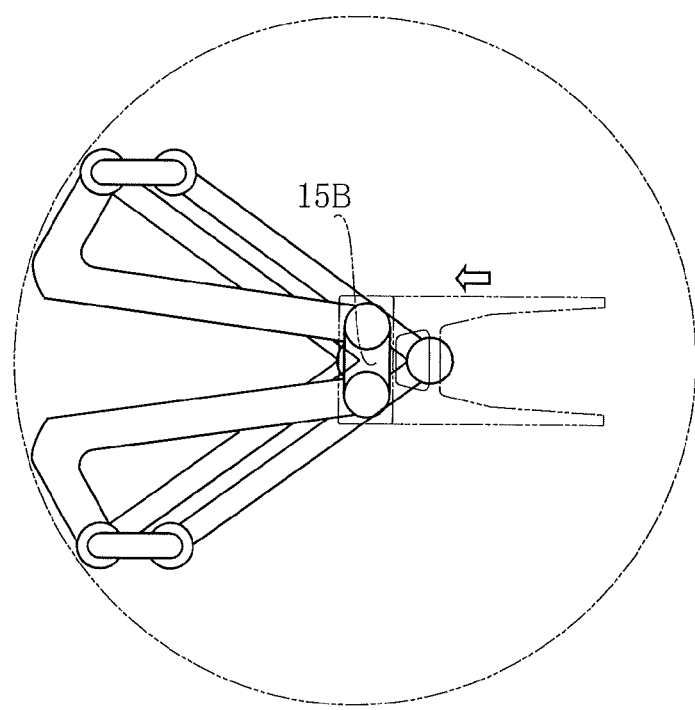
FIG. 15 is a plan view similar to FIG. 13 wherein some other components are omitted for convenience of illustration.

FIG. 13 is a plan view illustrating the first extension posture of the transfer apparatus 1 of FIG. 11. FIG. 14 is a plan view similar to FIG. 13, but the second right swing arm, the second left swing arm, the second wrist and so on are omitted. FIG. 15 is a plan view similar to FIG. 13, but the first right swing arm, the first left swing arm, the first wrist and so on are omitted.

As illustrated in FIG. 13, the drive unit 71 is actuated to pivot the right swing arm assembly 41 counterclockwise relative to the base 11 while pivoting the left swing arm assembly 51 clockwise relative to the base 11.

Specifically, the first right swing arm 41A of the right swing arm assembly 41 is driven to pivot counterclockwise. As noted above, when the first right swing arm 41A pivots counterclockwise, the second right swing arm 41B also pivots counterclockwise following the pivoting of the first right swing arm 41A.

On the other hand, the second left swing arm 51B of the left swing arm assembly 51 is driven to pivot clockwise. As noted above, when the second left swing arm 51B pivots clockwise, the first left swing arm 51A also pivots clockwise following the pivoting of the second left swing arm 51B.

The pivotal movement of the first right swing arm 41A and the first left swing arm 51A causes the first right link arm 43A to pivot relative to the right swing arm assembly 41 (the first right swing arm 41A) while causing the first left link arm 53A to pivot relative to the left swing arm assembly 51 (the first left swing arm 51A). As a result, the first holder 15A and the first wrist 14A proceed in the third direction X3.

On the other hand, due to the pivotal movement of the right swing arm assembly 41 (the first right swing arm 41A and the second right swing arm 41B) and the left swing arm assembly 51 (the first left swing arm 51A and the second left swing arm 51B), the second right link arm 43B pivots relative to the right swing arm assembly 41 (the second right swing arm 41B), whereas the second left link arm 53B pivots relative to the left swing arm assembly 51 (the second left swing arm 51B). As a result, the second holder 15B and the second wrist 14B also move in the third direction X3. The movement speed (retreating speed) of the second holder 15B and the second wrist 14B is lower than the advancing speed of the first holder 15A and the first wrist 14A.

In this way, the transfer apparatus 1β shifts to the posture illustrated in FIG. 13. The posture of the transfer apparatus 1β illustrated in FIG. 13 is referred to as "first extension posture". With the transfer apparatus 1β assuming the first extension posture, a workpiece 89 can be supported (placed) on the first holder 15A due to upward movement of the movement mechanism 13 along with the first holder 15A.
[From First Extension Posture to Original Posture]

Then, though not illustrated, the right swing arm assembly 41 (the first right swing arm 41A and the second right swing arm 41B) and the left swing arm assembly 51 (the first left swing arm 51A and the second left swing arm 51B) are pivoted in the reverse direction. Thus, the transfer apparatus 1β returns to the original posture illustrated in FIG. 11 with the workpiece 89 held on the first holder 15A.
[Subsequent Process]

Thereafter, similarly to the first embodiment, transfer of the workpieces 89 is performed by shifting the transfer apparatus 1β to the second extension posture and so on.
[Advantages]

The embodiment provides the following advantages in addition to the advantages already described for the first embodiment.

In the second embodiment, the first right pivotal axis 41Aa is offset from the second right pivotal axis 41Ba in the first direction X1. The right connector 418 is connected to the first right swing arm 41A for pivoting relative to the first right swing arm 41A about the first right intermediate axis 43Aa extending in the second direction X2, and the right connector 418 is also connected to the second right swing arm 41B for pivoting relative to the second right swing arm 41B about the second right intermediate axis 43Ba extending in the second direction X2. According to this arrangement, inclination of an imaginary line connecting the first right intermediate axis 43Aa and the second right intermediate axis 43Ba during the operation of the transfer apparatus 1p can be set to a desired inclination by appropriately setting the distance L43 between the first right intermediate axis 43Aa and the second right intermediate axis 43Ba. For instance, when the distance L43 between the first right intermediate axis 43Aa and the second right intermediate axis 43Ba is set equal to the distance L41 between the first right pivotal axis 41Aa and the second right pivotal axis 41Ba, the imaginary line connecting the first right intermediate axis 43Aa and the second right intermediate axis 43Ba can be kept parallel to the first direction X1 throughout the whole operation of the transfer apparatus 1β regardless of its posture. If the imaginary line connecting the first right intermediate axis 43Aa and the second right intermediate axis 43Ba is kept parallel to the first direction X1 during the operation of the transfer apparatus 1β, the first right link arm 43A, for example, is prevented from interfering with the shaft extending along the second right intermediate axis 43Ba even when the first right link arm 43A has a straight form without a bent portion. This holds true for the second right link arm 43B, the first left link arm 53A and the second left link arm 53B as well.

By contrast, when the distance L43 between the first right intermediate axis 43Aa and the second right intermediate axis 43Ba is set larger than the distance L41 between the first right pivotal axis 41Aa and the second right pivotal axis 41Ba, each of the first wrist 14A and the second wrist 14B can be further retreated when the transfer apparatus 4 assumes the original posture.

In the second embodiment, one of the first right swing arm 41A and the second right swing arm 41B is a driving arm pivoted by the drive unit 71, whereas the other of the first right swing arm 41A, and the second right swing arm 41B is a follower arm that pivots following the pivoting of the driving arm. Similarly, one of the first left swing arm 51A, and the second left swing arm 51B is a driving arm pivoted by the drive unit 71, whereas the other of the first left swing arm 51A, and the second left swing arm 51B is a follower arm that pivots following the rotation of the driving arm. Moreover, two swing arms (first right swing arm 41A and second left swing arm 51B) are pivoted directly by the single motor 716 as the drive unit 71. The use of a single motor leads to a cost reduction in comparison with using a plurality of motors. However, the two swing arms (first right swing arm 41A and the second left swing arm 51B) may be pivoted separately by a plurality of motors. Such a structure is also covered by the scope of the present invention.

The present invention is not limited to the foregoing embodiments. The specific structure of each component of the present invention can be varied in design in many ways.

Although a wrist is employed as an example of a movable part and a holder is attached to the wrist in the embodiments described above, the present invention is not limited to such a structure. For instance, the movable part may be configured to have an additional function of holding or supporting a workpiece.

What is claimed is:

1. A transfer apparatus comprising:
    a base;
    a first holder;
    a second holder offset from the first holder in a first linear direction; and
    a movement mechanism for moving the first holder and the second holder relative to the base in a plane parallel to the first linear direction;
    wherein the movement mechanism includes a pair of swing members, a pair of first link arms and a pair of second link arms that are substantially equal in length to the first link arms, respectively,
    each of the swing members is pivotally supported on the base,
    each of the first link arms is pivotally connected to the first holder, each of the first link arms being also connected to a respective one of the swing members for pivoting about a first intermediate axis extending in a second linear direction perpendicular to the first linear direction,
    each of the second link arms is pivotally connected to the second holder, each of the second link arms being also connected to a respective one of the swing members for pivoting about a respective second intermediate axis extending in the second linear direction, and
    each second intermediate axis is offset from the respective first intermediate axis in a third linear direction opposite to the first linear direction.

2. The transfer apparatus according to claim 1, wherein each of the first link arms crosses a respective one of the second link arms.

3. The transfer apparatus according to claim 1, further comprising a drive unit disposed in the base,
    wherein the drive unit pivots each of the swing members relative to the base.

4. The transfer apparatus according to claim 1, wherein each of the first link arms includes a bent portion projecting in the first linear direction.

5. The transfer apparatus according to claim 1, wherein each of the second link arms includes a bent portion projecting in the third linear direction.

6. The transfer apparatus according to claim 1, wherein each of the swing members comprises a swing arm, and
    each of the first link arms and each of the second link arms are pivotally connected to the swing arm.

7. The transfer apparatus according to claim 6, wherein each of the swing arms crosses a respective one of the first link arms and a respective one of the second link arms.

8. The transfer apparatus according to claim 1, wherein each of the swing members comprises a swing arm assembly which includes:
    a first swing arm having a first end pivotally connected to the base and a second end pivotally connected to a respective one of the first link arms for pivoting about the first intermediate axis,
    a second swing arm having a first end pivotally connected to the base and a second end pivotally connected to a respective one of the second link arms for pivoting about the second intermediate axis, and
    a connector pivotally connected to the first and second swing arms at the first and second intermediate axes, respectively.

9. The transfer apparatus according to claim 8, wherein the first swing arm is pivotally connected to the base for pivoting about a first pivotal axis,
    the second swing arm is pivotally connected to the base for pivoting about a second pivotal axis, and
    the first pivotal axis is offset from the second pivotal axis in the first linear direction.

10. The transfer apparatus according to claim 9, wherein a distance between the first intermediate axis and the second intermediate axis is equal to a distance between the first pivotal axis and the second pivotal axis.

* * * * *